Figure 1:
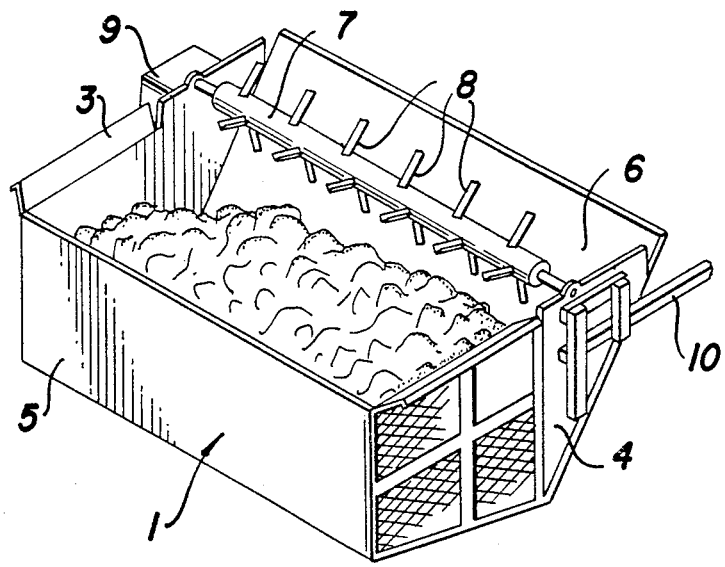

United States Patent [19]

Conway

[11] Patent Number: 4,958,756
[45] Date of Patent: Sep. 25, 1990

[54] COTTON BASKET UNLOADING REGULATOR

[76] Inventor: Gerald Conway, Rte. 1, Box 105, Itta Bena, Miss. 38941

[21] Appl. No.: 286,804

[22] Filed: Dec. 20, 1988

[51] Int. Cl.⁵ .............................................. B65D 83/00
[52] U.S. Cl. .................................... 222/164; 222/410; 414/408; 56/16.6; 56/28
[58] Field of Search .............. 222/164, 166, 410, 411, 222/414; 19/33, 85, 94, 105; 56/16.6, 28; 414/408, 421, 501; 298/11

[56] References Cited

U.S. PATENT DOCUMENTS

| | | | |
|---|---|---|---|
| 258,849 | 5/1882 | Burdine et al. | 19/94 X |
| 361,543 | 4/1887 | Pegues | 222/412 |
| 1,790,339 | 1/1931 | Chandler | 19/94 X |
| 1,876,819 | 9/1932 | Wuest | 19/105 |
| 1,890,845 | 12/1932 | Elston | 222/410 |
| 2,579,527 | 12/1951 | Weyerhaeuser | 222/410 X |
| 3,730,396 | 5/1973 | Harper et al. | 222/166 |
| 3,858,759 | 1/1975 | Lubenow | 222/414 X |
| 3,888,424 | 6/1975 | Chapman | 222/164 X |
| 4,390,376 | 6/1983 | Rood, Jr. | 56/28 X |
| 4,520,617 | 6/1985 | Fachini et al. | 56/16.6 |
| 4,625,368 | 12/1986 | Leifeld | 19/85 X |
| 4,662,160 | 5/1987 | Hubbard et al. | 56/16.6 |
| 4,832,554 | 5/1989 | Gaskin | 222/414 X |
| 4,888,940 | 12/1989 | Deutsch | 56/16.6 |

FOREIGN PATENT DOCUMENTS 30500  10/1922  Denmark ............................ 222/410

*Primary Examiner*—H. Grant Skaggs
*Assistant Examiner*—Boris Milef
*Attorney, Agent, or Firm*—Larson and Taylor

[57] ABSTRACT

A cotton basket unloading regulator is provided for transporting cotton from a conventional cotton basket into a trailer or the like. The regulator comprises a rotatable shaft having a plurality of fingers mounted thereon with a motor for rotating the shaft at variable speed. By varying the speed of rotation of the rotating shaft, the cotton being delivered from the cotton basket to the trailer may be regulated and the rotation of the shaft also serves to break up chunks and wads of cotton as well as stopping the discharge of the cotton from the basket. The present invention provides a regulator for regulating the unloading of cotton from a cotton basket into a trailer.

4 Claims, 1 Drawing Sheet

U.S. Patent         Sep. 25, 1990         4,958,756

COTTON BASKET UNLOADING REGULATOR

BACKGROUND OF THE INVENTION

There has been provided in the prior art various types of devices for delivering cotton from a cotton basket into a cotton trailer or module builder. Cotton which is picked from the fields is delivered to a large basket which when filled is dumped into a module builder or trailer. It is difficult to control the amount of cotton dumped into the trailer as the cotton tends to form into one big chunk or wad which moves as one unit from the cotton basket into the trailer. There have been various types of devices which attempt to provide a smooth feed to regulate the thickness of the cotton discharged into the trailer. For example, the Hubbard et al U.S. Pat. No. 4,662,160 discloses a conveyor which is mounted on the inclined discharge side of a cotton basket. A metering bar is positioned above and inwardly from the end of the conveyor and is rotated to regulate the thickness of the cotton delivered to the trailer and to provide a continuous flow of cotton into the trailer. However, this device is not entirely satisfactory in that the cotton tends to be dumped in one chunk or wad and the conveyor belt and meter bar as shown in the Hubbard patent do not provide means for breaking up the wads of cotton.

The Rood U.S. Pat. No. 4,390,376 discloses an apparatus which is designed to remove dirt and debris from cotton as it is picked up by a conveyor belt. There is included in this structure a rotating drum having pegs thereon which breaks up and loosens debris as the clumps of cotton are fed into an auger feed mechanism. The Fachini et al U.S. Pat. No. 4,520,617 discloses a cotton basket having a chain conveyor for unloading the cotton onto the discharge chute. There is no teaching in the prior art of a device which will simultaneously perform the plurality of functions carried out by the present invention which include in addition to delivering the cotton to the cotton trailer, the thickness of the cotton being fed to the trailer is controlled and the clumps or wads within the cotton delivered are broken up. In addition, delivery of the cotton from the cotton bed may be halted by terminating the rotation of the regulator.

SUMMARY OF THE INVENTION

The present invention provides a regulator for cotton baskets which includes a rotating shaft mounted in spaced relation to the discharge surface of the cotton basket. The rotating shaft is of considerable diameter and is provided with elongated fingers which are spaced along the length of the shaft and around the periphery thereof. The regulator is disposed so that the fingers extend at least one-third the distance between the regulator and the discharge surface of the cotton basket. Motor means is provided to rotate the shaft and to vary the speed of rotation of the shaft so that the rate at which cotton is fed into the cotton trailer ma be controlled. The elongated fingers on the regulator serve to break up clumps or wads of cotton and also functions to halt the discharge of cotton from the cotton basket into the trailer. The fingers extend into the cotton to such an extent that by stopping the rotation of the shaft the cotton will not continue to be discharged as the fingers extend down into the cotton a substantial distance tends to hold the cotton from discharge.

An object of the present invention is to provide a regulator for a cotton basket which regulates the flow of cotton from a cotton basket into a trailer.

Another object of the present invention is to provide a regulator for a cotton basket which includes a rotatable shaft having elongated fingers along the length and around the periphery thereof to control the amount and condition of cotton being fed to the cotton trailer.

Figure 2:
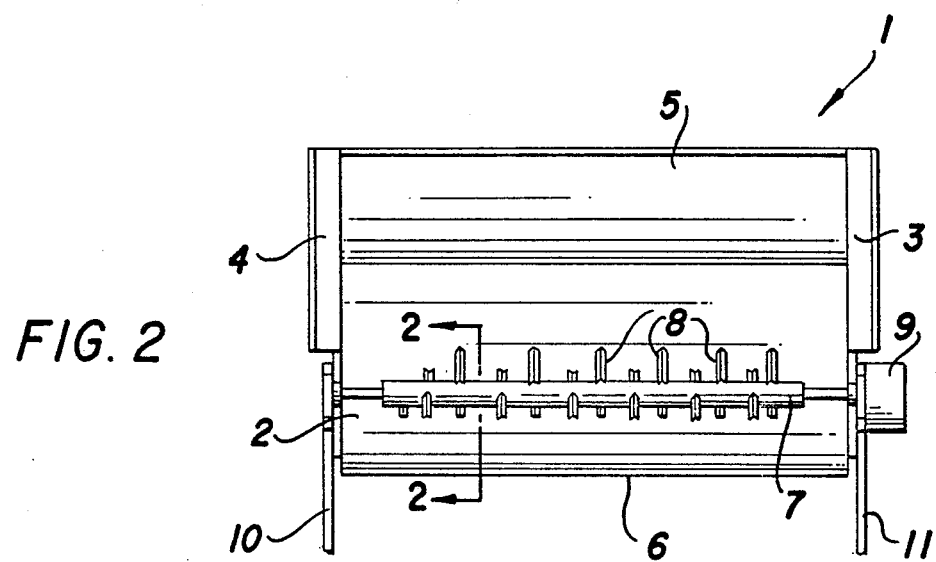
Figure 3:
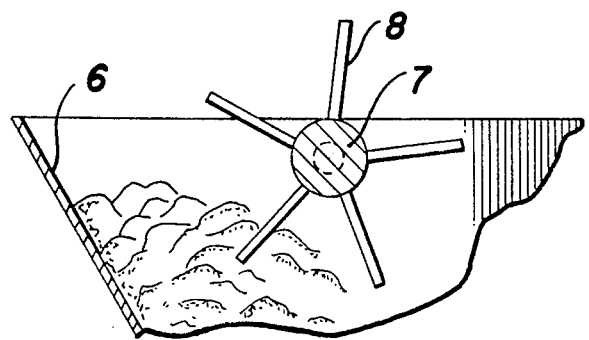

Other objects and many of the attendant advantages of the present invention will become more readily apparent on consideration of the following detailed specification in connection with the accompanying drawings wherein:

FIG. 1 is a perspective view of a cotton basket having the regulator mounted thereon, FIG. 2 is a front elevation of the cotton basket, and FIG. 3 is a cross sectional view of the regulator along the lines 2—2 of FIG. 2.

Referring now to the drawings wherein like numerals refer to like parts throughout the several views there is shown at 1 a cotton basket having a bottom wall 2, side walls 3 and 4, rear wall 5 and an inclined discharge surface 6. The structure of this cotton basket is conventional.

Mounted in spaced relation to the inclined discharge surface 6 and on the upper ends of side walls 3 and 4, there is provided a regulator which controls the flow of cotton from the cotton basket over the discharge surface.

The regulator includes a rotatable shaft 7 which is journalled in the side walls 3 and 4. The shaft 7 has a plurality of elongated fingers 8 thereon and it can be seen from FIGS. 1 2 and 3 that the fingers are disposed along the length of the shaft and around the periphery thereof. A motor 9 is provided to drive the shaft so as to rotate the elongated fingers within the cotton disposed in the cotton basket. The cotton basket is provided with outwardly extending arm 10 and 11, FIG. 2, which support the basket from a lifting and dumping machine.

In a typical structure the rotating shaft has a diameter of approximately 10 inches and the individual elongated arms have a length of approximately 12 inches. The elongated arms extend from approximately one-third to one-half of the distance between the axis of the rotating shaft and the outer edge surface of the inclined discharge surface 6 as can be seen in FIGS. 1 and 2.

In operation after a cotton basket is filled, it is raised and tilted so as to dump the contents of the cotton baskets into a cotton trailer. Initially, the cotton will not flow into the cotton basket until the rotating shaft is actuated to drive the elongated arms in a direction so that the cotton is moved towards the discharge end of the cotton basket. The elongated arms perform the function of breaking up wads or chunks of cotton and the rotating shaft provides a means of regulating the thickness of the cotton which is delivered to the cotton trailer. The motor is variable speed so that as the cotton trailer approaches the filled position, the motor can be slowed down so as to reduce the flow of cotton into the cotton trailer. When the trailer is filled, the motor may be shut off to entirely stop the flow. In this way the cotton trailer may be filled with cotton to the desired level without spilling or wastage and the cotton delivered to the cotton trailer is broken up into relatively small cotton balls.

Obviously many modifications and variations of the present invention are possible in light of the above teachings.

What is claimed as new and is desired to be secured by Letters Patent is:

1. A cotton basket for delivering cotton to a cotton trailer comprising, a container having a pair of side walls, a rear wall interconnecting the side walls on one side thereof, an inclined discharge wall interconnecting the side walls on the opposite side thereof, a bottom wall interconnecting the bottom edge of the rear wall and inclined discharge wall, a pair of outwardly extending arms mounted on the side walls for supporting the cotton basket when the cotton basket is lifted to dump cotton into a cotton trailer, means mounted between the upper ends of the side walls for breaking up wads of cotton, regulating the thickness of cotton delivered to a cotton trailer and terminating the flow of cotton into a cotton trailer, said means comprising a rotatable shaft having a plurality of elongated fingers on said shaft, said elongated fingers extending between one third and one half the distance between the axis of the rotatable shaft and the upper edge of the inclined discharge wall, and motor means mounted on the side wall adjacent said shaft for driving said rotatable shaft independently of movement of the cotton basket.

2. A cotton basket according to claim 1 wherein the elongated fingers are disposed in five rows around the circumference of said rotatable shaft.

3. A cotton basket according to claim 1 wherein the elongated fingers are approximately one foot in length.

4. A cotton basket according to claim 1 wherein the motor means is variable speed.

* * * * *